Sept. 8, 1925.
L. A. HOBERDIER ET AL
1,552,604
ADVERTISING DEVICE
Filed March 3, 1923
2 Sheets-Sheet 2
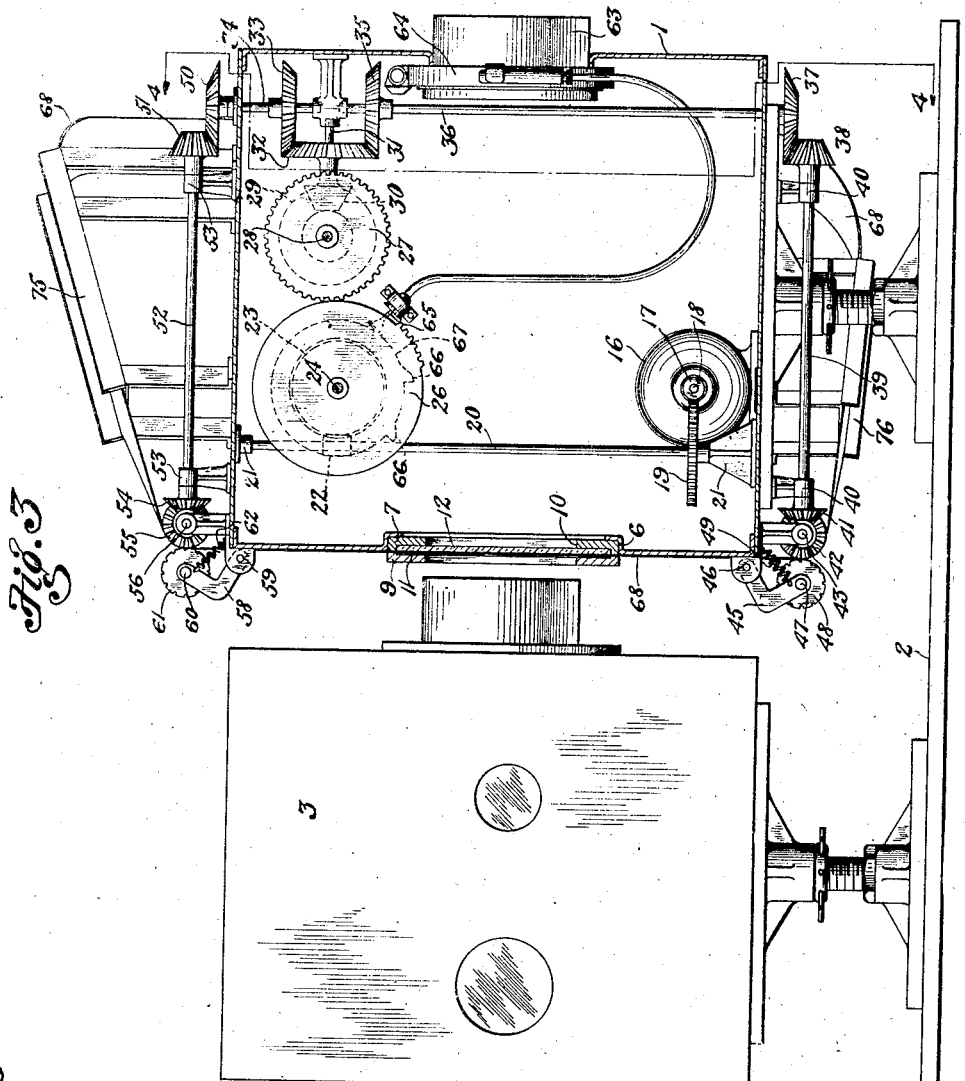
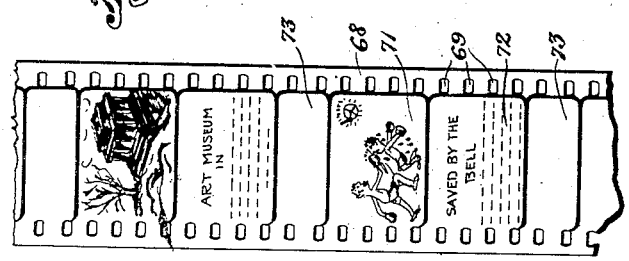
Inventor
L. A. Hoberdier and
H. L. Shafer
By Freass and Bond
Attorneys Patented Sept. 8, 1925.

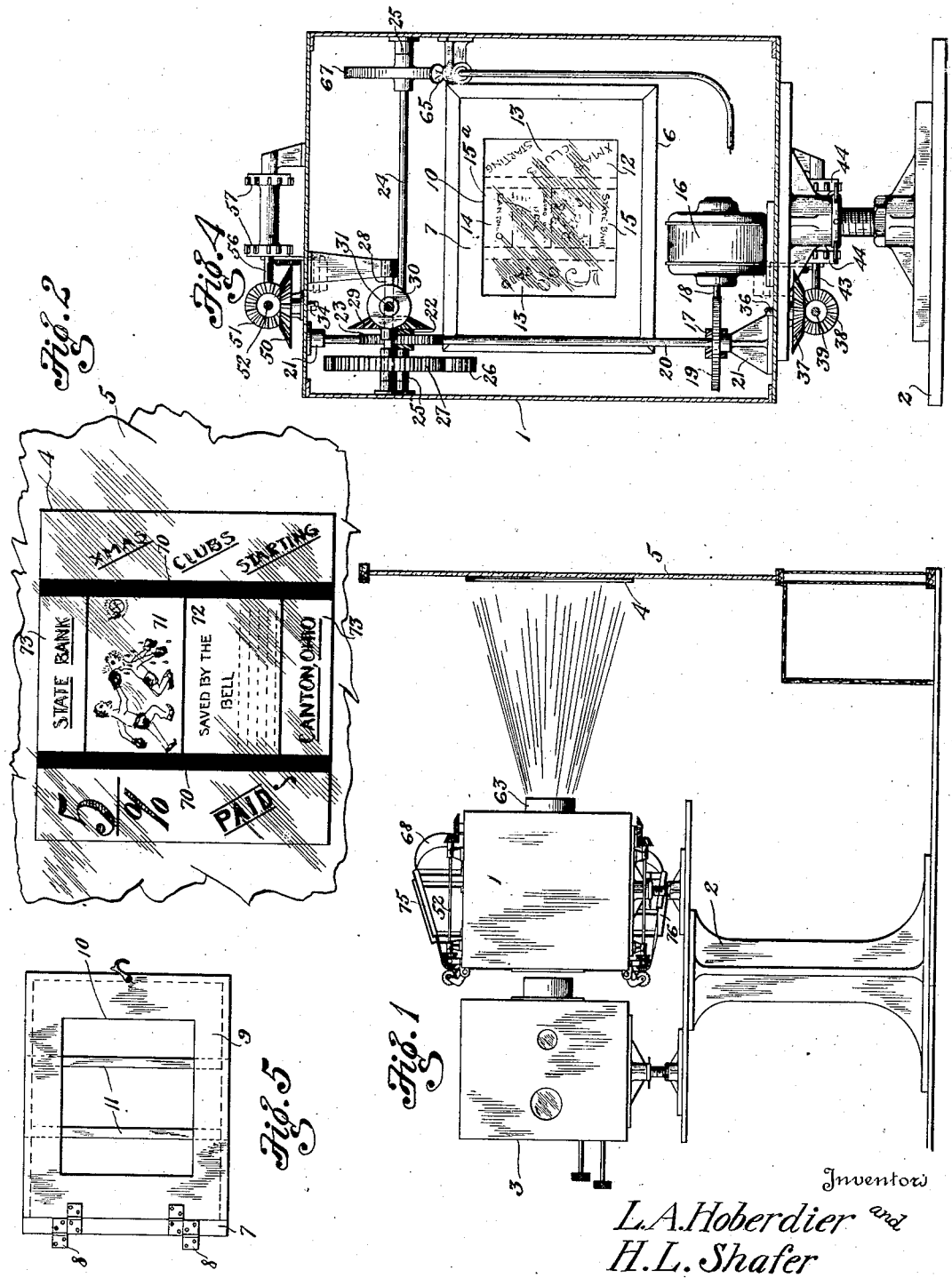

1,552,604

UNITED STATES PATENT OFFICE.

LEWIS A. HOBERDIER, OF CANTON, AND HARRY L. SHAFER, OF SALEM, OHIO; SAID HOBERDIER ASSIGNOR TO SAID SHAFER.

ADVERTISING DEVICE.

Application filed March 3, 1923. Serial No. 622,619.

*To all whom it may concern:*

Be it known that we, LEWIS A. HOBERDIER and HARRY L. SHAFER, both citizens of the United States, residing at Canton, Stark County, Ohio, and Salem, Columbiana County, Ohio, respectively, have invented a certain new and useful Improvement in Advertising Devices, of which the following is a specification.

This invention relates to advertising devices and more particularly to a device for projecting an advertisement upon a screen placed in a window of a place of business.

The objects of the invention are to provide an advertising device for projecting a picture or the like upon a screen and provided with means for automatically changing the picture at predetermined intervals, means being provided for temporarily cutting off the light from the screen while the change of pictures is being made.

The above and other objects may be attained by constructing the device in the manner illustrated in the accompanying drawings, in which—

Figure 1 is a side elevation of the machine embodying the invention, showing the projecting screen placed in a show window;

Fig. 2, an elevation of the screen from the outside of the window, showing the manner in which the picture and advertising matter are displayed upon the screen;

Fig. 3, an enlarged, longitudinal, sectional view through the machine embodying the invention;

Fig. 4, a transverse, sectional view through the machine on the line 4—4, Fig. 3;

Fig. 5, an elevation of the frame which holds the lantern slide and through which the film is passed; and Fig. 6, a fragmentary elevation of a portion of the film.

Similar numerals of reference indicate corresponding parts throughout the drawings.

The mechanism comprises broadly means for holding a lantern slide in position to be projected upon a screen located in a show window, the lantern slide having a blank or clear portion across which a moving picture film is fixed, means being provided for stopping the film temporarily as each new picture is displayed and for temporarily cutting off the light and automatically moving the film until the next picture is in position to be displayed through the clear portion of the lantern slide, the operation of the mechanism being continuous and automatic.

The mechanism to which the invention pertains is enclosed within a housing 1 mounted upon a suitable base or pedestal 2 which supports a lamp house 3 of any usual construction, in position to project a light through the lantern slide and film, and project the picture upon a transparent screen 4 mounted in a show window 5 or similar place, to be viewed from the outside.

The housing 1 of the machine is provided in its rear wall with an opening 6 in which is mounted a frame 7 hinged at one side as at 8 to the wall of the housing, and provided with a hinged door 9 having the central, rectangular opening 10 through which a pair of spaced, vertical spring members 11 are located.

The lantern slide shown at 12 is mounted within the frame 9 and is provided with the advertising matter, as shown at 13 upon the outside of each spring member 11 and as shown at 14 and 15 at the top and bottom edges, the central portion 15ª of the lantern slide being clear or blank.

For the purpose of operating the mechanism, a motor as shown at 16 may be mounted upon the bottom of the housing 1, a worm 17 being fixed upon the shaft 18 of the motor and meshing with a worm wheel 19 upon the vertical shaft 20 which is mounted in the bearings 21 in the upper and lower walls of the housing.

A worm 22 is fixed upon the shaft 20 and meshes with a worm wheel 23 upon a horizontal shaft 24 mounted in suitable bearings 25 carried in the side walls of the housing. A mutilated gear 26 is mounted upon the shaft 24 and arranged to intermittently mesh with a gear 27 upon a countershaft 28, a bevel gear 29 thereon meshing with a bevel pinion 30 upon the shaft 31 upon which is also mounted the beveled gear 32 meshing with the bevel gear 33 upon the upper vertical shaft 34 and with the bevel gear 35 upon the lower vertical shaft 36, said last named shaft extending outward through the bottom of the housing.

A bevel gear 37 is fixed upon the lower end of the shaft 36 and meshes with a bevel pinion 38 fixed upon one end of the horizontal shaft 39 journaled in bearings 40 suspended from the bottom of the housing, a bevel pinion 41 upon the opposite end of said shaft meshing with a bevel pinion 42 upon the transverse, horizontal shaft 43 upon which is fixed a spaced pair of sprocket wheels 44.

A bracket 45 is pivoted as at 46 to the rear side of the housing and carries a horizontal shaft 47 upon which is mounted a spaced pair of notched disks 48, the peripheral notches thereon being arranged to register with the teeth upon the sprocket wheels, and a pull spring 49 tends to normally urge the notched disks 48 into engagement with the sprocket wheels.

A bevel gear 50 is fixed upon the upper end of the shaft 34 above the top of the housing and meshes with a bevel pinion 51 upon the shaft 52, which is journaled in bearings 53 mounted upon the top of the housing. A bevel pinion 54 upon the opposite end of the shaft 52 meshes with a similar pinion 55 upon the shaft 56 upon which is mounted a spaced pair of sprocket wheels 57 similar to the sprocket wheels 44.

A bracket 58 similar to the bracket 45 is pivoted as at 59 upon the rear wall of the housing and has journaled therein a shaft 60 upon which are fixed a spaced pair of notched disks 61 similar to the disks 48, said disks being normally held in engagement with the sprocket wheels 57 by means of a spring 62.

A lens of suitable design is mounted in the lens barrel 63 and an ordinary camera shutter 64 of any suitable and well known design is located in the lens barrel and operated by the usual cable release 65 arranged to be operated by cam lugs 66 upon the disk 67 mounted upon the shaft 24.

The film indicated at 68 is endless and is passed through the frame 9 beneath the hinged door 10 thereof, the springs 11 of the door covering the sprocket holes 69 of the film to prevent their showing upon the screen, forming a black border as shown at Fig. 2 upon each side of the picture. It will be seen that the film is passed across the blank or clear portion 16 of the lantern slide.

As shown in Figs. 2 and 6, two frames 71 and 72 of the film are exposed at a time, the frame 71 having a picture thereon and the frame 72 having the title of the picture. A half frame 73 which is blank or clear, is provided above each frame 71 and below each frame 72, these clear or blank portions registering with the lettered portions 14 and 15 of the lantern slide.

The film passes upward over the sprocket wheels 57 and over the inclined trough 75, which carries the film to one side of the housing 1, the film passing down along the side of the housing and through the trough 76 at the bottom thereof to the sprocket wheels 44.

In operating the device, a lantern slide with the desired advertising matter thereon is placed in the frame 4 and a film is located over the sprocket rollers and through the troughs 75 and 76, the door 9 being opened to permit the film to be passed over the face of the lantern slide, after which the door is closed and latched, the spring 11 holding the film against the face of the lantern slide.

The motor is then started and through the gearing above described, the film will be automatically moved every time the mutilated gear 26 makes one complete revolution, the film remaining in position between operations of the sprocket wheels by the mutilated gear.

The cable release 65 will be operated by the cam lugs 66 to close the shutter before the film starts to move, and to open the shutter as soon as the film has stopped its movement.

It will thus be seen that a very attractive advertising device is provided, in which permanent printed matter of an advertising nature may be displayed throughout an entire evening, while pictures of any interesting subjects such as news items or the like, together with their titles and reading matter concerning the same will be intermittently displayed during the entire time the machine is operated, the light being flashed off and on as each change is made.

We claim:

1. A device of the character described including a lantern slide having a blank central portion and printed portions above and below and upon each side of the blank portion, a film the width of the blank portion having a series of still pictures and titles thereon and having blank spaces therebetween, and means for passing the film across the face of the lantern slide and intermittently stopping the same with the blank portions of each member registering with the printed portions of the other member.

2. A device of the character described including a lantern slide having a blank central portion and printed portions upon each side of the blank portion, a film the width of the blank portion having a series of pictures thereon, and provided with sprocket holes along its sides, means for moving the film across the blank portion of the lantern slide, means for projecting an image of the film and lantern slide upon a screen and spring strips covering the sides of the film and preventing the image of the sprocket holes from being projected upon the screen.

In testimony that we claim the above, we have hereunto subscribed our names.

LEWIS A. HOBERDIER.
HARRY L. SHAFER.